(12) United States Patent
Yamada

(10) Patent No.: US 8,661,516 B2
(45) Date of Patent: Feb. 25, 2014

(54) BIOMETRIC AUTHENTICATION DEVICE AND BIOMETRIC AUTHENTICATION METHOD

(75) Inventor: Shigefumi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/436,844

(22) Filed: Mar. 31, 2012

(65) Prior Publication Data

US 2012/0304267 A1    Nov. 29, 2012

(30) Foreign Application Priority Data

May 27, 2011    (JP) .................................. 2011-119243

(51) Int. Cl.
G06F 21/00    (2013.01)
(52) U.S. Cl.
USPC ............... 726/7; 382/124; 382/125; 382/126; 382/127; 382/115; 726/28
(58) Field of Classification Search
USPC ................. 382/124–127, 115, 305; 726/7
See application file for complete search history.

(56) References Cited

U.S. PATENT DOCUMENTS

| | | | | |
|---|---|---|---|---|
| 5,033,089 A * | 7/1991 | Fujimoto et al. | ............... | 704/247 |
| 5,333,139 A * | 7/1994 | Sturges | ..................... | 714/727 |
| 5,920,628 A * | 7/1999 | Indeck et al. | ................... | 360/25 |
| 6,198,836 B1 * | 3/2001 | Hauke | ........................... | 382/125 |
| 6,614,919 B1 * | 9/2003 | Suzaki et al. | .................. | 382/117 |
| 6,929,180 B2 * | 8/2005 | Tsukamoto et al. | ........... | 235/382 |
| 7,260,527 B2 * | 8/2007 | Koshiba | ........................ | 704/233 |
| 7,359,534 B2 * | 4/2008 | Semba et al. | ................ | 382/124 |
| 7,409,341 B2 * | 8/2008 | Koshiba | ........................ | 704/233 |
| 7,415,408 B2 * | 8/2008 | Koshiba | ........................ | 704/233 |
| 7,447,634 B2 * | 11/2008 | Koshiba | ........................ | 704/254 |

(Continued)

FOREIGN PATENT DOCUMENTS

| | | |
|---|---|---|
| EP | 2 073 147 | 6/2009 |
| JP | H11-514771 | 12/1999 |
| JP | 2001-092961 | 4/2001 |
| JP | 2004-145447 | 5/2004 |

OTHER PUBLICATIONS

Vincenzo Conti, et al. ; A Frequency-based Approach for Features Fusion in Fingerprint and Iris Multimodal Biometric Identification Systems; 2010 , pp. 384-395; Biometrics Compendium, IEEE.*

(Continued)

*Primary Examiner* — Justin T Darrow
*Assistant Examiner* — Angela Holmes
(74) *Attorney, Agent, or Firm* — Fujitsu Patent Center

(57) ABSTRACT

A biometric authentication device includes: a matching data generating unit which generates matching data from at least one biometric image representing a plurality of pieces of biometric information of a user; a mutual biometric information feature amount extraction unit which extracts a mutual biometric information feature amount representing the degree of similarity between two pieces of biometric information of the plurality of pieces of biometric information; a selection unit, which, for each of the first predetermined number of the registered users, computes a first selecting score based on the mutual biometric information feature amounts of the user and the registered users and selects the second predetermined number of registered users in order of decreasing the level of similarity based on the first selecting score of each registered users; and a matching unit which matches the matching data of the selected registered users with the matching data of the user.

10 Claims, 9 Drawing Sheets

(56) References Cited

U.S. PATENT DOCUMENTS

| | | | |
|---|---|---|---|
| 7,617,058 B2* | 11/2009 | Kim et al. | 702/79 |
| 7,657,431 B2* | 2/2010 | Hayakawa | 704/246 |
| 7,773,780 B2* | 8/2010 | Schneider et al. | 382/116 |
| 7,796,784 B2* | 9/2010 | Kondo et al. | 382/117 |
| 8,031,981 B2* | 10/2011 | Peirce | 382/305 |
| 8,111,878 B2* | 2/2012 | Sato | 382/115 |
| 8,121,838 B2* | 2/2012 | Kobal et al. | 704/235 |
| 8,332,916 B2* | 12/2012 | Isobe et al. | 726/5 |
| 8,369,583 B2* | 2/2013 | Yoshimine et al. | 382/116 |
| 2003/0029913 A1* | 2/2003 | Tsukamoto et al. | 235/382 |
| 2003/0125943 A1* | 7/2003 | Koshiba | 704/238 |
| 2004/0144841 A1* | 7/2004 | Tsukamoto et al. | 235/382 |
| 2005/0152583 A1* | 7/2005 | Kondo et al. | 382/117 |
| 2005/0185828 A1* | 8/2005 | Semba et al. | 382/124 |
| 2005/0195975 A1* | 9/2005 | Kawakita | 380/30 |
| 2006/0106571 A1* | 5/2006 | Kim et al. | 702/179 |
| 2007/0233475 A1* | 10/2007 | Koshiba | 704/231 |
| 2007/0233476 A1* | 10/2007 | Koshiba | 704/231 |
| 2007/0233480 A1* | 10/2007 | Koshiba | 704/243 |
| 2008/0172230 A1* | 7/2008 | Hayakawa | 704/249 |
| 2008/0212846 A1* | 9/2008 | Yamamoto et al. | 382/115 |
| 2009/0214083 A1* | 8/2009 | Sato | 382/107 |
| 2010/0011423 A1* | 1/2010 | Isobe et al. | 726/5 |
| 2010/0115597 A1* | 5/2010 | Murakawa | 726/7 |
| 2010/0223663 A1* | 9/2010 | Morimoto et al. | 726/7 |
| 2010/0284575 A1* | 11/2010 | Yoshimine et al. | 382/116 |
| 2011/0110594 A1* | 5/2011 | Hasegawa et al. | 382/190 |
| 2011/0129128 A1* | 6/2011 | Makimoto et al. | 382/124 |
| 2011/0188710 A1* | 8/2011 | Muquit | 382/115 |
| 2012/0230555 A1* | 9/2012 | Miura et al. | 382/124 |

OTHER PUBLICATIONS

Jian-Gang Wang, et. al.; Fusion of Appearance Image and Passive Stereo DepthMap for Face Recognition Based on the Bilateral 2DLDA; Aug. 2007; Journal on Image and Video Processing , vol. 2007 Issue 2.*

Extended European Search Report mailed by EPO and corresponding to European Application No. 12161752.6 on Sep. 7, 2012.

Tan, Xuejun et al., "A robust two step approach for fingerprint identification," Pattern Recognition Letters, vol. 24, No. 13 (Sep. 1, 2003), NH Elsevier, Center for Research in Intelligence Systems, University of California, Riverside, CA, pp. 2127-2134.

* cited by examiner

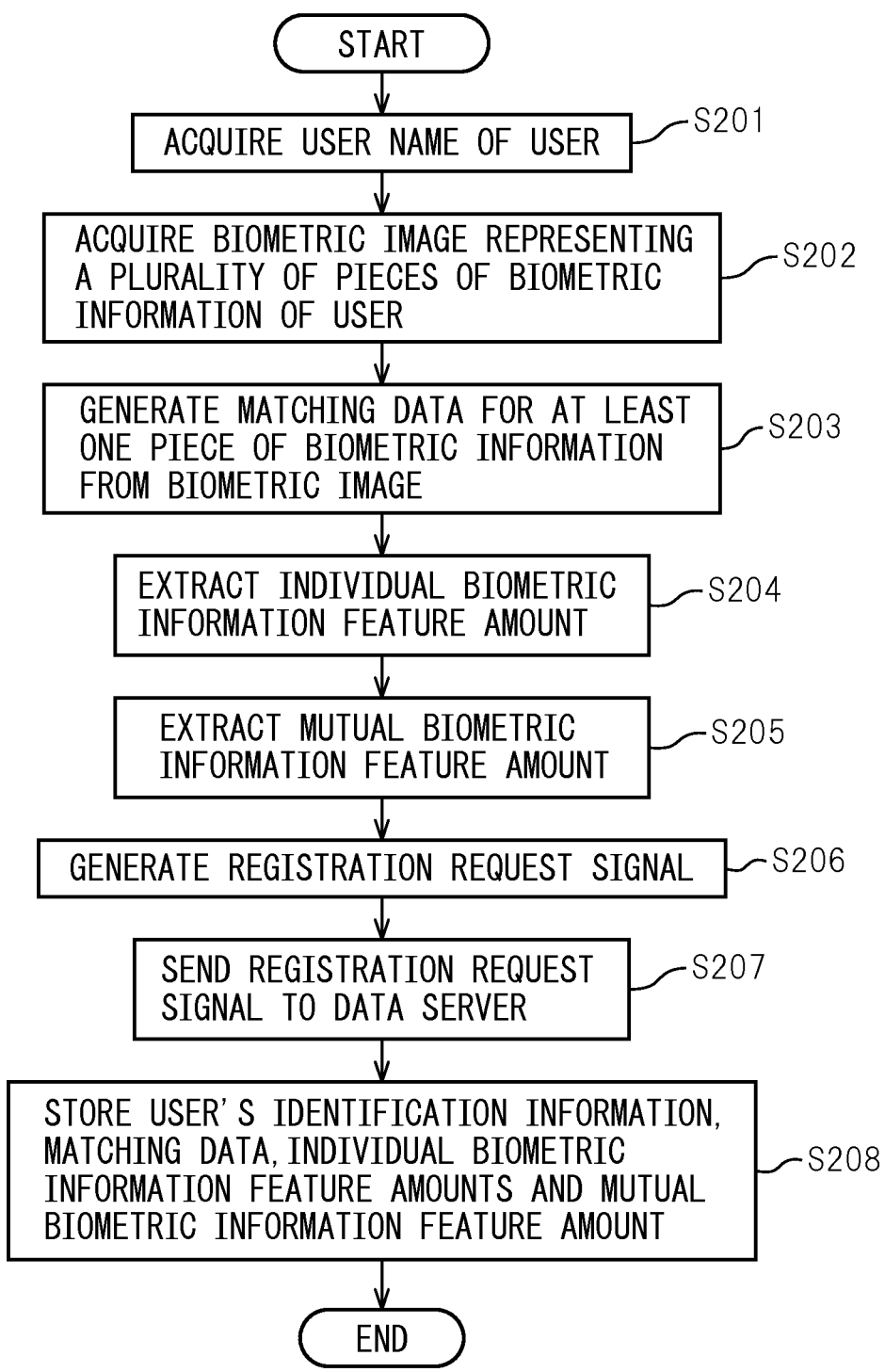

FIG.9
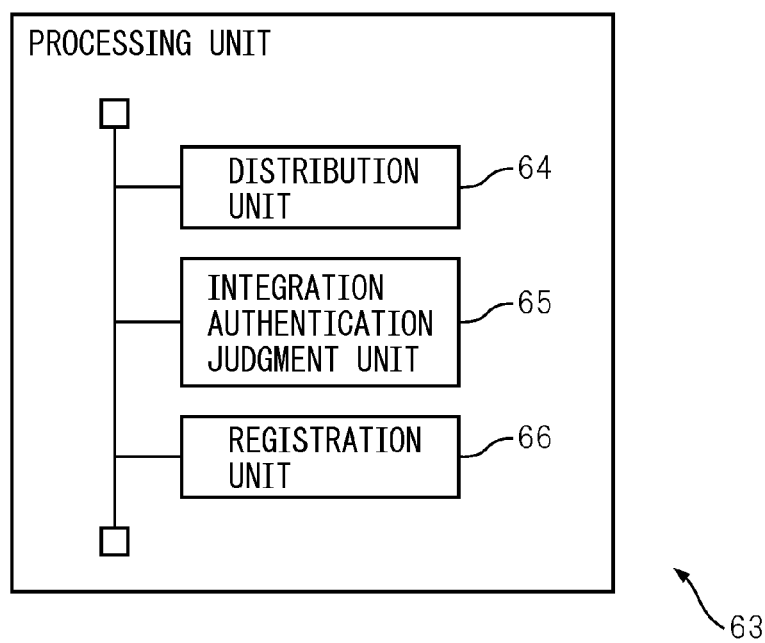
FIG.10A  FIG.10B  FIG.10C
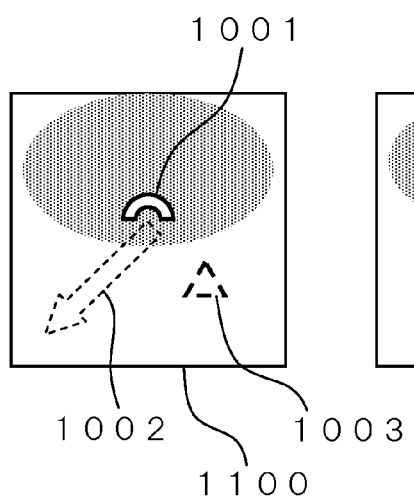
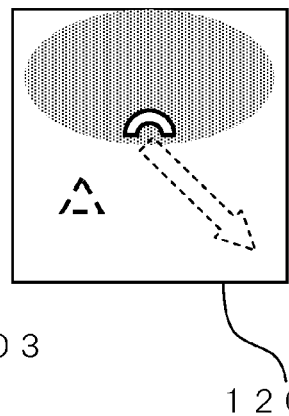
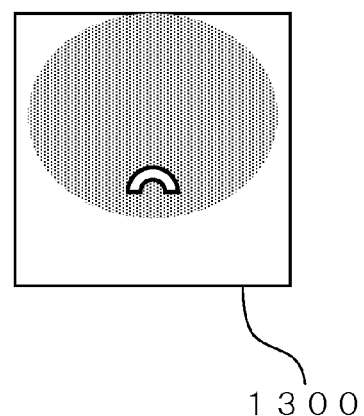

BIOMETRIC AUTHENTICATION DEVICE AND BIOMETRIC AUTHENTICATION METHOD

CROSS-REFERENCE TO RELATED APPLICATION

This application is based upon and claims the benefit of priority of the prior Japanese Patent Application No. 2011-119243, filed on May 27, 2011, and the entire contents of which are incorporated herein by reference.

FIELD

The embodiments discussed herein are related to a biometric authentication device for performing biometric authentication based on biometric information represented in a biometric image, to a biometric authentication method and to a computer program for biometric authentication.

BACKGROUND

Recent years have seen the development of biometric authentication techniques for authenticating a user of an apparatus or system based on a biometric image representing the user's biometric information such as a hand or finger vein pattern, a fingerprint or a palm print. A biometric authentication device using such biometric authentication techniques acquires, as an input biometric image, a biometric image representing, for example, the biometric information of the user who is to use the biometric authentication device. Then, the biometric authentication device matches the user's input biometric information represented in the input biometric image with registered biometric information which is biometric information represented in the preregistered images of registered users. If it is determined as a result of the matching process that the input biometric information matches the registered biometric information, the biometric authentication device authenticates the user as being a legitimate registered user. Then, the biometric authentication device permits the authenticated user to use a device including the biometric authentication device or some other device connected to the biometric authentication device.

In such a biometric authentication device, higher authentication accuracy is preferred so as to not inconvenience a user. Thus, a technique using fingerprints of two or more fingers for biometric authentication using the fingerprints as biometric information in order to improve the authentication accuracy (for example, see Japanese Patent Laid-Open No. 2001-92961 and Published Japanese Translation of PCT International Publication for Patent Application No. 1999-514771) is suggested.

Biometric authentication techniques include a so-called 1:1 authentic mode and a 1:N authentic mode. In the 1:1 authentic mode, by inputting user's identification information, such as a user name or an identification number, together with user's input biometric information, registered biometric information corresponding to the identification information is identified. Then, a biometric authentication device matches the input biometric information only with the identified registered biometric information.

In contrast, in the 1:N authentic mode, user's identification information is not input into a biometric authentication device, so that registered biometric information corresponding to the user may not be identified. Therefore, the biometric authentication device matches input biometric information with all preregistered biometric information. Then, the biometric authentication device authenticates the user as a registered user corresponding to the registered biometric information that best matches the input biometric information. Accordingly, with increasing the number of registered users, that is, with increasing the amount of the registered biometric information, the number of times of execution of a matching process is also increased. Therefore, time necessary for a biometric authentication process is also inevitably prolonged. When a biometric authentication technique is utilized particularly in a large-scale system, the number of registered users may be very high. There has been a fear that, when a server is used in a large-scale client system, for executing a biometric authentication process, access concentrates on a server to increase a load on the server, so that latency time from inputting of biometric information by a user to obtaining of an authentication result is prolonged.

However, shorter time necessary for a biometric authentication process is preferred from the viewpoint of user's usability. Thus, a technique for limiting registered biometric information utilized in matching with input biometric information (for example, see Japanese Patent Laid-Open No. 2004-145447) is suggested.

In an example of the known art as described above, a fingerprint matching device selects a registered fingerprint matching an input fingerprint by comparing a selecting parameter value, representing the feature amount of the input fingerprint, with the selecting parameters of a plurality of registered fingerprints, and matches the selected registered fingerprint with the input fingerprint. Then, as the selecting parameters, the rate of a ridge region to the whole fingerprint region, a spacing between a ridge and a valley, the number of weighted feature points, and a value obtained by weighting a ridge direction in a plurality of feature points with the confidence level of the feature points are used.

SUMMARY

An operation amount in a biometric authentication process in the case of using a plurality of pieces of biometric information in biometric authentication as disclosed in Japanese Patent Laid-Open No. 2001-92961 or Published Japanese Translation of PCT International Publication for Patent Application No. 1999-514771 is more than that in the case of using only one piece of the biometric information in the biometric authentication. Therefore, when a biometric authentication technique in which a plurality of pieces of biometric information are used is applied to a 1:N authentic mode, it is preferable to decrease the number of pieces of registered biometric information selected for executing a detailed matching process in which an operation amount is relatively increased.

According to one embodiment, a biometric authentication device is provided. The biometric authentication device includes: a biometric information acquiring unit which generates at least one biometric image representing a plurality of pieces of biometric information of a user; a matching data generating unit which generates matching data representing a feature for at least one of the plurality of pieces of biometric information from the at least one biometric image; a mutual biometric information feature amount extraction unit which extracts a mutual biometric information feature amount representing the degree of similarity between two pieces of biometric information of the plurality of pieces of biometric information in the at least one biometric image; a storage unit which, for each of the first predetermined number of registered users, stores the matching data of the registered users and the mutual biometric information feature amount; a selection unit, which, for each of the first predetermined number of the registered users, computes a first selecting score representing the level of similarity between the plurality of pieces of biometric information of the user and the plurality of pieces of biometric information of the registered users, based on the mutual biometric information feature amount of the user and the mutual biometric information feature amounts of the registered users, and selects the second predetermined number of registered users less than the first predetermined number in order of decreasing the level of similarity based on the first selecting score for each of the first predetermined number of registered users; and a matching unit which matches the matching data of the selected registered users with the matching data of the user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is an operation flowchart of a registration process.

FIG. 9 is a functional block diagram of a processing unit of a master authentication server.

FIG. 10A to FIG. 10C are schematic views of fingerprints representing representative fingerprint types, respectively.

DESCRIPTION OF EMBODIMENTS

A biometric authentication device according to various embodiments will be described below with reference to the drawings. The biometric authentication device stores a mutual biometric information feature amount representing the degree of similarity between a plurality of pieces of biometric information as a feature amount for selecting a registered user to be matched, for each of a plurality of registered users. Then, the biometric authentication device compares a mutual biometric information feature amount extracted from one or more biometric images representing a plurality of pieces of user's biometric information with the mutual biometric information feature amounts of the registered users when a biometric authentication process is executed for a user according to a 1:N authentic mode. Then, the biometric authentication device selects a registered user to be matched based on the comparison results.

In the present embodiment, the biometric authentication device uses a fingerprint as the biometric information for biometric authentication. However, the biometric information for biometric authentication may also be other kinds of biometric information, such as a finger vein pattern, that is represented by a still image and included in a plurality of sites in the human body.

In this specification, the term "matching process" is used to refer to the process for computing the degree of similarity representing the level of similarity between the input biometric information and the registered biometric information. Further, the term "biometric authentication process" is used to refer not only to the matching process but also to the entire authentication process including the process for determining whether the user is an authenticated user or not by using the result from the matching process.

Figure 1:
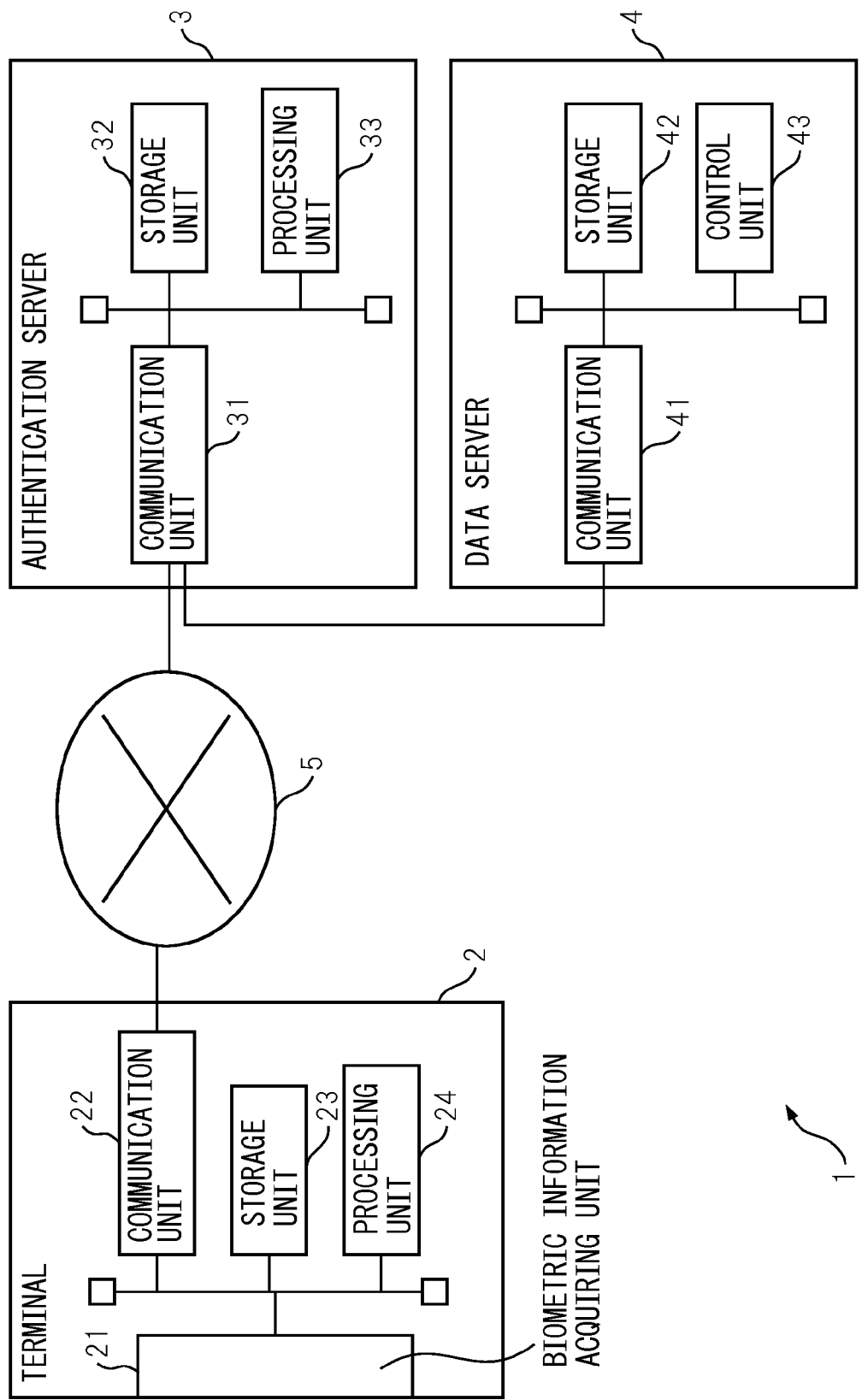
FIG. 1 is a diagram illustrating the configuration of a biometric authentication device according to a first embodiment.

FIG. 1 is a diagram illustrating the configuration of the biometric authentication device. As illustrated in FIG. 1, the biometric authentication device 1 includes at least one terminal 2, an authentication server 3 and a data server 4. The terminal 2 and the authentication server 3 are connected to each other via a communication network 5 such as a public communication channel or a local area network. In addition, the authentication server 3 is connected to the data server 4, for example, via a specific communication channel or another communication network independent of the communication network 5. The data server 4 may also be connected to the authentication server 3 via the communication network 5.

The terminal 2 creates biometric images photographed from a plurality of sites including the biometric information of a user to be authenticated. Then, the terminal 2 generates matching data used in the matching process from the biometric images, extracts a selecting feature amount for selecting the biometric information, and sends the matching data and the selecting feature amount to the authentication server 3.

The authentication server 3 selects a registered user to be subjected to the matching process from the registered users registered in the data server 4 based on the selecting feature amount when executing the biometric authentication process. Then, the authentication server 3 executes the matching process using matching data generated from registered biometric images representing the plurality of pieces of biometric information of the selected registered user and the matching data generated from the user's biometric images. As a result of the matching process, the authentication server 3 provides to the terminal 2 notification of whether or not the user has been authenticated as registered user.

When executing the biometric authentication process and registering the biometric information, the terminal 2 generates the biometric images photographed from the plurality of pieces biometric information of the user, generates the matching data from the biometric images, and extracts the selecting feature amount. To do so, the terminal 2 includes the biometric information acquiring unit 21, a communication unit 22, the storage unit 23 and the processing unit 24.

Further, the terminal 2 may also include an input unit (not illustrated) such as a keyboard, a mouse or a touchpad, used for the user to input to the terminal 2, a command, data or identification information such as a user's user name. Further, the terminal 2 may include a display unit (not illustrated) such as a liquid crystal display in order to display a guidance message for adequately placing a finger at a position in which the biometric information acquiring unit 21 can acquire a biometric image representing biometric information; a biometric authentication result; or the like.

The biometric information acquiring unit 21 generates biometric images representing the fingerprints of the plurality of fingers of the user. To do so, the biometric information acquiring unit 21 includes, for example, a fingerprint sensor having an area sensor which is capable of simultaneously photographing a plurality of fingers. Then, the biometric information acquiring unit 21 passes the generated biometric images to the processing unit 24.

The communication unit 22 includes a communication interface circuitry for connecting the terminal 2 to the communication network 5. Then, the communication unit 22 sends to the authentication server 3 data received from the processing unit 24 via the communication network 5. The communication unit 22 may also pass to the processing unit 24 information representing an authentication result received from the authentication server 3 via the communication network 5.

The storage unit 23 includes at leas one of, for example, a semiconductor memory, a magnetic disk unit and an optical disk drive. The storage unit 23 stores various programs used for controlling the terminal 2 and data. The storage unit 23 also stores a program used for generating matching data from biometric images and for extracting a selecting feature amount. Furthermore, the storage unit 23 may also temporarily store the biometric images, the matching data and the selecting feature amount.

The processing unit 24 includes one or a plurality of processors and their peripheral circuitry. Then, the processing unit 24 generates the matching data from the biometric images photographed from the plurality of pieces of user's biometric information and extracts the selecting feature amount when the biometric authentication process is executed and the registration process is executed.

Figure 2:
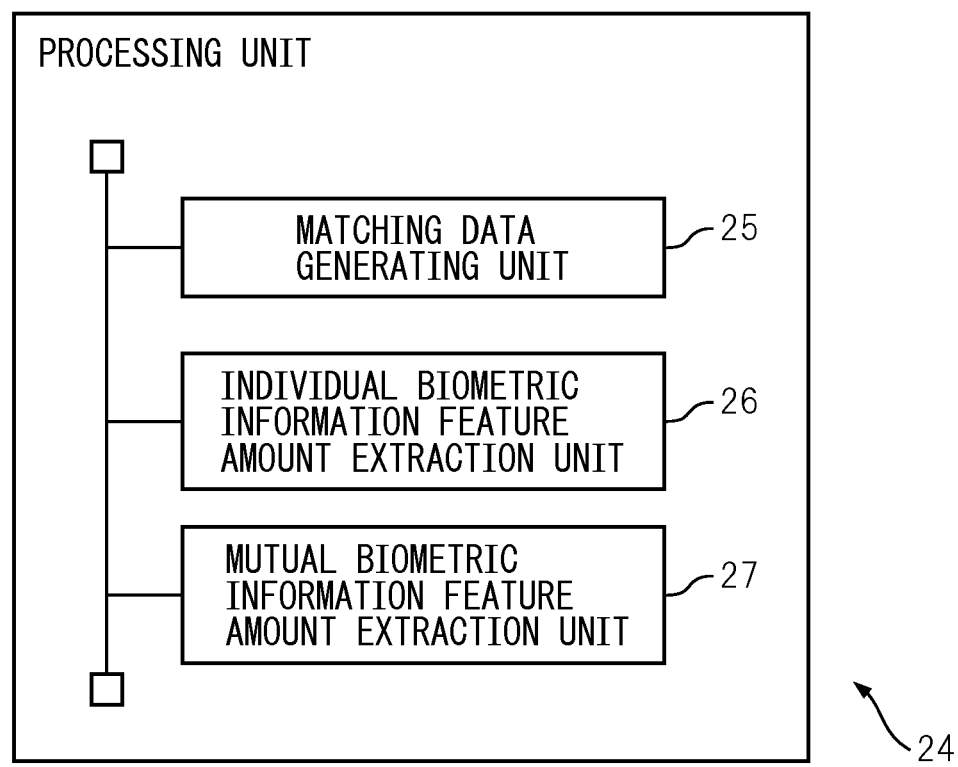
FIG. 2 is a functional block diagram of a processing unit of a terminal.

FIG. 2 is a functional block diagram of the processing unit 24 of the terminal 2. The processing unit 24 includes a matching data generating unit 25, an individual biometric information feature amount extraction unit 26 and a mutual biometric information feature amount extraction unit 27. Each of these units included in the processing unit 24 is a functional module implemented by a computer program executed on the processor included in the processing unit 24. Alternatively, each of these units included in the processing unit 24 may also be implemented as firmware in the terminal 2.

The matching data generating unit 25 generates the matching data used in the matching process from the biometric images. For example, when the authentication server 3 carries out the matching process by minutia-matching, the matching data generating unit 25 extracts a feature point used in the minutia-matching (referred to as minutia) from the biometric images and sets the position of the feature point or the kind of the feature point as the matching data.

The matching data generating unit 25 extracts, for example, the branch points and end points of ridges as feature points to be used in the minutia-matching. To do so, the matching data generating unit 25, for example, binarizes a biometric image with a predetermined threshold value so as to, for example, distinguish a biometric region representing a site including the user's biometric information from a background region representing no site of the user in the biometric image and generates a binarized biometric image. The predetermined threshold value is set to, for example, a preset fixed value, the average brightness value of respective pixels in the biometric image, and a threshold value determined by discriminant analysis of the brightness value of pixels included in the whole biometric image or a part thereof. In this case, the matching data generating unit 25 temporarily stores the binarized biometric image in the storage unit 23 so that the individual biometric information feature amount extraction unit 26 and the mutual biometric information feature amount extraction unit 27 can use the binarized biometric image. Furthermore, the matching data generating unit 25 binarizes, for example, the biometric region so that ridges and valleys have different values in order to extract the branch and end points of the ridges. Then, the matching data generating unit 25 performs thinning on the binarized biometric region to generate a thinned binary image in which the ridges are thinned. Then, the matching data generating unit 25 detects a position on the thinned binary image where, by scanning the thinned binary image using a plurality of templates corresponding to either of the branch and end points of the ridges, any of templates matches. Then, the matching data generating unit 25 extracts as minutiae center pixels at the detected position. The templates are represented by, for example, 3×3 pixels and have a binary pattern corresponding to the branch or end points of the ridges. Furthermore, the matching data generating unit 25 may also extract as a minutia a singular point such as the whorl center or delta of the fingerprint. The matching data generating unit 25 can detect the singular point, for example, by pattern-matching the templates corresponding to the singular point with the biometric images, similarly with the case of detecting the branch or end points of the ridges. Alternatively, the matching data generating unit 25 may also divide the thinned binary image into a plurality of small regions, determine the radius of curvature of a ridge in each small region, and judge the whorl center to be positioned at the centroid of the small region in which the radius of curvature is minimum.

Furthermore, the matching data generating unit 25 specifies a finger region, which is a region representing each finger, on the biometric image. Thus, the matching data generating unit 25 sets a plurality of scanning lines at equal spacings in the horizontal direction to the vertical direction of the binarized biometric image. Similarly, the matching data generating unit 25 sets a plurality of scanning lines at equal spacings in the vertical direction to the horizontal direction of the binarized biometric image. Then, by detecting a border between a biometric region and a background region on each scanning line, the matching data generating unit 25 sets as one finger region a biometric region surrounded in a generally U-shaped configuration by the border.

Alternatively, the matching data generating unit 25 may also specify a finger region corresponding to each finger by dividing the biometric region by a line passing through the middle point between adjacent whorl centers.

The matching data generating unit 25 sets an identification number which is uniquely determined for each finger region. For example, when the nimble, middle, ring and little fingers are represented on the biometric image in order of them from the left, the matching data generating unit 25 sets identification numbers representing the nimble, middle, ring and little fingers in order of them from the left for the respective finger regions on the biometric image, respectively. Then, the matching data generating unit 25 judges which finger region includes each extracted minutia and associates each minutia with a finger identification number corresponding to the finger region including the minutia.

The matching data generating unit 25 may also specify each finger region prior to extracting minutiae and extract the minutiae only for finger regions corresponding to one or more specific fingers such as the nimble finger.

The matching data generating unit 25 may also extract a minutia from the biometric image using another known method of determining the end, branch or singular points of the ridges as the minutiae. Furthermore, the matching data generating unit 25 may also determine as a matching feature amount the number of ridges included between two extracted minutiae or a ridge direction in the vicinity of the minutiae. The matching data generating unit 25 can use any known method of determining a ridge direction in order to determine the ridge direction in the vicinity of the minutiae.

When the authentication server 3 performs the matching process by pattern-matching, the matching data generating unit 25 may also use as matching data a biometric image per se or a part of the region cut from the biometric image. When the part of the biometric image is set as the matching data, the part of the region preferably includes the fingerprint of each finger represented by the biometric image. Thus, the matching data generating unit 25 may also binarize, for example, the biometric image so that the biometric region is different from the background region and use the circumscribed rectangle of the biometric region as matching data. Furthermore, the matching data generating unit 25 may also use as matching data an image obtained by performing an edge enhancement process, an irregularity compensation process or the like of the whole biometric image or a part of the biometric image.

The individual biometric information feature amount extraction unit 26 extracts an individual biometric information feature amount which is an example of selecting feature amounts from at least one of a plurality of pieces of biometric information represented by a biometric image. The individual biometric information feature amount is a feature amount representing the feature of each piece of the biometric information per se.

Figure 3:
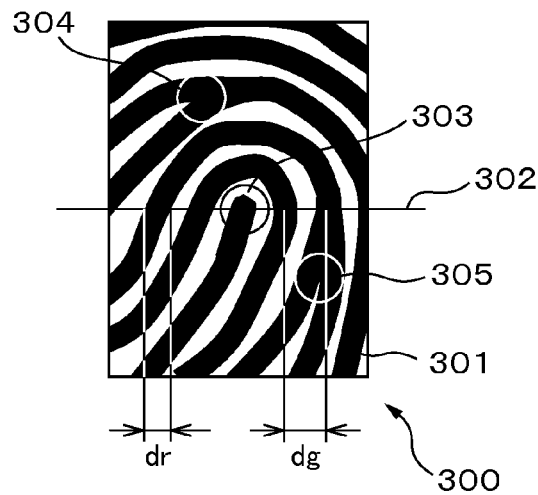
FIG. 3 is a schematic view illustrating an example of individual biometric information feature amounts extracted from one fingerprint represented by a biometric image.

FIG. 3 is a schematic view illustrating an example of individual biometric information feature amounts extracted from one fingerprint represented by the biometric image. In a fingerprint 300 illustrated in FIG. 3, ridges 301 are represented by black lines. For example, the average value of the widths dr of the ridges 301 along a scanning line 302 is an example of the individual biometric information feature amounts. The average value of spacings dg between the adjacent ridges 301 along the scanning line 302 is also an example of the individual biometric information feature amounts. Furthermore, there are the end point 303 (the end point 303 is a whorl center) and branch points 304 and 305 of the ridge 301 in the fingerprint 300. A minutia density obtained by dividing the number of these minutiae (three in this example) by the area of the region representing the fingerprint is also an example of the individual biometric information feature amounts.

In the present embodiment, the individual biometric information feature amount extraction unit 26 extracts as an individual biometric information feature amount at least one of the average value of the widths of the ridges, the ridge spacings and the minutia density for each finger. The individual biometric information feature amount extraction unit 26 may also extract the individual biometric information feature amount only for at least one specific finger of a plurality of fingers represented by the biometric image.

To extract the individual biometric information feature amount, the individual biometric information feature amount extraction unit 26 specifies a finger region which is a region representing each finger on a biometric image, similarly with the case in which the matching data generating unit 25 extracts the minutiae. Then, the individual biometric information feature amount extraction unit 26 binarizes each finger region on the biometric image so that ridges and valleys have different values, in order to determine ridge widths and ridge spacings. The individual biometric information feature amount extraction unit 26 computes, for example, for each finger region, the average brightness value of pixels included in the finger region or a value determined by discriminant analysis of the brightness values of the pixels included in the finger region, as a threshold value for binarizing each pixel into a ridge and a valley.

The individual biometric information feature amount extraction unit 26 computes the ridge widths by scanning a finger region binarized along at least one scanning line passing through a fingerprint center in each finger region to detect the borders between the ridges and the valleys and sets the average value of the ridge widths as the widths of the finger ridges corresponding to the finger region. The fingerprint center may be set as, for example, the whorl center of the fingerprint or the centroid of a region corresponding to a region from the top to the first joint of the finger in the finger region. The scanning line is set, for example, in the direction of passing through a predetermined point and across the finger in the crosswise direction or in the direction from the predetermined point to the top of the finger.

The individual biometric information feature amount extraction unit 26, for example, divides each finger region into a plurality of small regions in order to detect the first joint of the finger in each finger region. Each small region has, for example, a size of 16×16 pixels so as to include one or more ridges. Then, the individual biometric information feature amount extraction unit 26 determines a ridge direction for each small region. In this case, the individual biometric information feature amount extraction unit 26 sets as the ridge direction in each region, for example, the average value of a plurality of lines obtained by linking pixels corresponding to the ridges in each small region in a tangential direction.

In the vicinity of the first joint, there are many small regions in which the ridge direction is generally perpendicular to the longitudinal direction of the finger region. Thus, the individual biometric information feature amount extraction unit 26 counts the number of small regions closer to the bottom of the finger than the whorl center, in which the ridge direction is a direction generally perpendicular to the longitudinal direction of the finger region, for each of a plurality of directions, for each of lines that are perpendicular to the directions and have the widths of the small regions. Then, the individual biometric information feature amount extraction unit 26 detects, as a first joint, such a line that the number of small regions in which the ridge direction is a direction generally perpendicular to the longitudinal direction of the finger region is maximum.

Alternatively, for each finger region, for each of the plurality of directions, the individual biometric information feature amount extraction unit 26 computes powers which are the sums of the squares of the brightness values of the respective lines that are perpendicular to the directions and have a width of one pixel to determine the power of each line. Then, the individual biometric information feature amount extraction unit 26 may also detect the position of the first joint by performing matching based on dynamic programming for the distribution of the determined power of each line and the power of each line of a standard finger. Alternatively, the individual biometric information feature amount extraction unit 26 may also detect the position, of the first joint according to another known procedure of detecting the position of the first joint of the finger on the biometric image.

The longitudinal directions of the respective fingers are different on biometric images between biometric images obtained by photographing fingers in the state of separating the fingers from each other and biometric images obtained by photographing fingers in the state of bringing the fingers into intimate contact with each other. In such a case, when scanning lines are set in the same direction to all the finger regions, since angles between ridges and the scanning lines vary for each finger, the computed values of the widths of the ridges may vary depending on the longitudinal direction of a finger. Thus, the individual biometric information feature amount extraction unit 26 may determine as reference axes perpendicular lines drawn from fingerprint centers to lines representing the first joints to set the scanning lines to be at a predetermined angle, of for example 90°, with respect to the reference axes. As a result, the individual biometric information feature amount extraction unit 26 can suppress variations in the widths of the ridges due to the different longitudinal directions of the respective fingers.

The individual biometric information feature amount extraction unit 26 performs thinning on each binarized finger region, determines the average value of spacings between adjacent thinned ridges along the above-described scanning line, and sets the average value as the ridge spacing of the finger corresponding to the finger region. The individual biometric information feature amount extraction unit 26 preferably sets the scanning line to be at the predetermined angle with respect to the reference axis even when determining the ridge spacing.

The individual biometric information feature amount extraction unit 26, for each finger region, determines the total of the number of minutiae included in the finger region and sets a value obtained by dividing the total by the number of pixels included in the finger region as the minutia density of the finger corresponding to the finger region. When the matching data generating unit 25 determines the positions of the minutiae and finger regions including the minutiae, the individual biometric information feature amount extraction unit 26 may also read the position of each minutia and the identification number of the finger representing the finger region including the minutia from the storage unit 23 to determine the minutia density using the position and the identification number. When the matching data generating unit 25 does not determine the branch and end points of the ridges, the individual biometric information feature amount extraction unit 26 preferably detects the minutiae according to the method described in the case of the matching data generating unit 25.

The individual biometric information feature amount extraction unit 26 stores an individual biometric information feature amount for each finger together with the identification number of each finger in the storage unit 23.

The mutual biometric information feature amount extraction unit 27 determines the degree of similarity between a plurality of pieces of biometric information represented by a biometric image, as a mutual biometric information feature amount. The mutual biometric information feature amount is also an example of selecting feature amounts.

Figure 4:
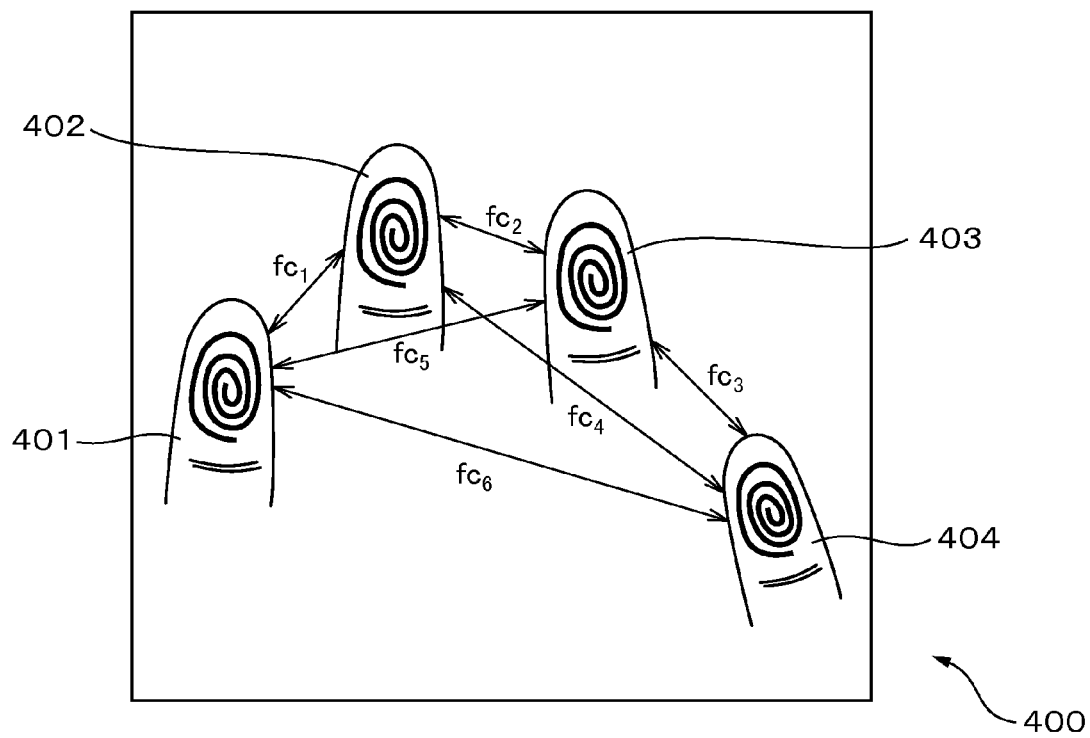
FIG. 4 is a schematic view illustrating an example of a biometric image.

FIG. 4 is a schematic view illustrating an example of a biometric image. The biometric image 400 represents the fingerprints 401-404 of the four fingers. Thus, the mutual biometric information feature amount extraction unit 27 determines each degree of similarity, $fc_i$ (i=1, 2, ..., 6), between two fingerprints of the fingerprints 401-404 as a mutual biometric information feature amount. For example, the degree of similarity $fc_1$ between the fingerprint 401 and the fingerprint 402 is one of mutual biometric information feature amounts. In this example, the six mutual biometric information feature amounts are computed as illustrated in FIG. 4.

The degree of similarity is represented, for example, by a Euclidean distance between individual biometric information feature amounts obtained for each finger as represented by the following equation:

$$fc_{ik} = \sqrt{\sum_{j=1}^{N_d} (fd_{ij} - fd_{kj})^2} \quad (1)$$

wherein $fd_{i,j}$ and $fd_{k,j}$ represent the j-th individual biometric information feature amount of the finger of an identification number i and the j-th individual biometric information feature amount of the finger of an identification number k, respectively (i≠k). Further, $N_d$ represents the total number of individual biometric information feature amounts extracted from each finger region. In addition, $fc_{ik}$ represents the degree of similarity between the finger of the identification number i and the finger of the identification number k, namely, a mutual biometric information feature amount. The degree of similarity $fC_{ik}$ may also be computed as a Euclidean distance between respective individual biometric information feature amounts normalized for each finger according to the following equation:

$$fc_{ik} = \sqrt{\sum_{j=1}^{N_d} ((fd_{ij} - fd_{kj})/fd_{Maxj})^2} \quad (2)$$

wherein $fd_{Maxj}$ is the maximum allowed value of the j-th individual biometric information feature amount.

Alternatively, the degree of similarity $fc_{iK}$ may also be determined as the Manhattan distance of each individual biometric information feature amount normalized according to the following equation:

$$fc_{ik} = \sum_{j=1}^{N_d} |(fd_{ij} - fd_{kj})/fd_{Maxj}| \quad (3)$$

Furthermore, the degree of similarity $fc_{ik}$ may also be the inverse number of a value computed by any of the equations (1) to (3).

When the mutual biometric information feature amount is computed based on the individual biometric information feature amount in such a manner, an operation amount needed for computing the mutual biometric information feature amount can be reduced since the mutual biometric information feature amount extraction unit 27 can use process results by the individual biometric information feature amount extraction unit 26.

Alternatively, the mutual biometric information feature amount extraction unit 27, while changing the relative positions of two finger regions of interest, performs pattern-matching between the two finger regions. Then, the mutual biometric information feature amount extraction unit 27 may also determine, for example, the maximum value of the normalized cross-correlation value between the two finger regions as the mutual biometric information feature amount of mutual fingerprints corresponding to the two finger regions.

Furthermore, the mutual biometric information feature amount extraction unit 27 may also determine the mutual biometric information feature amount of the mutual fingerprints corresponding to the two finger regions by minutia-matching between the two finger regions of interest. In this case, the mutual biometric information feature amount extraction unit 27 selects as a first reference point the minutia positioned in the vicinity of the center of either of the two finger regions of interest. The mutual biometric information feature amount extraction unit 27 also selects one of minutiae included in the other finger region as a second reference point. Then, the mutual biometric information feature amount extraction unit 27 moves the other finger region in parallel to make the second reference point match with the first reference point. The mutual biometric information feature amount extraction unit 27 may also use a singular point such as a whorl center as the first reference point or the second reference point. Thereafter, the mutual biometric information feature amount extraction unit 27 determines the number of minutiae matching between the two finger regions while rotating the other finger region. The mutual biometric information feature amount extraction unit 27 repeats the above-described process while changing a combination of the first reference point and the second reference point and determines the maximum value of the number of minutiae matching between the two finger regions.

Finally, the mutual biometric information feature amount extraction unit 27 determines a value obtained by dividing the maximum value of the number by the total number of minutiae included in the other finger region as the degree of similarity, namely, a mutual biometric information feature amount:

When the mutual biometric information feature amount is computed by pattern-matching or minutia-matching in such as manner, an operation amount needed for computing the mutual biometric information feature amount can be reduced since the mutual biometric information feature amount extraction unit 27 can use process results by the matching data generating unit 25.

The mutual biometric information feature amount extraction unit 27 stores the determined mutual biometric information feature amount together with the associated identification numbers of two fingers in the storage unit 23.

The processing unit 24 sends the matching data, the individual biometric information feature amounts, the mutual biometric information feature amount and the identification numbers of the fingers associated with the data and the feature amounts, together with the identification information of the user, to the authentication server 3 via the communication unit 22 when executing the registration process. In addition, the processing unit 24 sends the matching data, the individual biometric information feature amounts, the mutual biometric information feature amounts and the identification numbers of the fingers associated with the data and the feature amounts to the authentication server 3 via the communication unit 22 when executing the biometric authentication process.

The data server 4 stores data used in the biometric authentication process for all the registered users. To do so, the data server 4 includes a communication unit 41, a storage unit 42 and a control unit 43.

The communication unit 41 includes an interface circuitry for connecting the data server 4 to the authentication server 3 so that the data server 4 and the authentication server 3 can communicate with each other. Then, the communication unit 41 receives a registration request signal from the authentication server 3 and passes the registration request signal to the control unit 43 when executing the registration process. In addition, the communication unit 41 sends to the authentication server 3 the matching data, individual biometric information feature amounts and mutual biometric information feature amounts of the registered users and the identification numbers of the fingers associated with the data and the feature amounts, stored in the storage unit 42, when executing the biometric authentication process.

The storage unit 42 includes, for example, at least any one of a semiconductor memory, a magnetic disk unit or an optical disk drive. The storage unit 42 stores various programs used for controlling the data server 4 and data. The storage unit 42 also stores, for all the registered users, the identification information, matching data, individual biometric information feature amounts and mutual biometric information feature amounts of the users and the identification numbers of the fingers associated with the data and the feature amounts.

The control unit 43 includes at least one processor and a peripheral circuitry. Then, the control unit 43 stores the various pieces of information of the registered users included in the registration request signal in the storage unit 42 if receiving the registration request signal from the authentication server 3 when executing the registration process. If receiving a signal for requesting to send the selecting feature amount from the authentication server 3 when executing the biometric authentication process, the control unit 43 reads the individual biometric information feature amounts and mutual biometric information feature amounts of each registered user and the identification numbers of the fingers associated therewith from the storage unit 42 and sends them to the authentication server 3. If receiving a signal for requesting to send the matching data from the authentication server 3, the control unit 43 reads the matching data of the selected registered user and the identification numbers of the fingers associated therewith from the storage unit 42 and sends them to the authentication server 3.

The authentication server 3 sends the matching data, the individual biometric information feature amounts and the mutual biometric information feature amounts received from the terminal 2 and the identification numbers of the fingers associated with the data and the feature amounts, together with the identification information of the user, to the data server 4 when executing the registration process. The authentication server 3 selects a registered user for the matching process based on the individual biometric information feature amounts and the mutual biometric information feature amounts received from the terminal 2 when executing the biometric authentication process. Then, the authentication server 3 executes the matching process using the matching data of the selected registered user and the matching data received from the terminal 2 and judges whether or not authenticating the user as any of the registered users. Then, the authentication server 3 permits the user to use the device including the authentication server 3 when authenticating the user as any of the registered users. Alternatively, the authentication server 3 sends a signal that represents that the user has been authenticated to another device which is not illustrated and permits the user to use the other device.

To do so, the authentication server 3 includes a communication unit 31, a storage unit 32 and a processing unit 33.

The communication unit 31 includes a communication interface circuitry for connecting the authentication server 3 to the communication network 5. Then, the communication unit 31 passes information, received from the terminal 2 via the communication network 5, to the processing unit 33. The communication unit 31 may also send information representing the authentication results, received from the processing unit 33, to the terminal 2 via the communication network 5.

Further, the communication unit 31 includes an interface circuitry for connecting the authentication server 3 to the data server 4 so that the authentication server 3 and the data server 4 can communicate with each other. Then, the communication unit 31 receives the identification information, individual biometric information feature amounts and mutual biometric information feature amounts of each registered user and the matching data of the selected registered user from the data server 4 and passes them to the processing unit 33 when executing the biometric authentication process. The communication unit 31 sends to the data server 4 the matching data, the individual biometric information feature amounts and the mutual biometric information feature amounts received from the terminal 2 and the identification numbers of the fingers associated with the data and the feature amounts together with the identification information of the user when executing the registration process.

The storage unit 32 includes, for example, at least any one of a semiconductor memory, a magnetic disk unit and an optical disk drive. The storage unit 32 stores various programs used for controlling the authentication server 3 and data. The storage unit 32 also stores the identification information of all the registered users. Furthermore, the storage unit 32 temporarily stores the identification information, individual biometric information feature amounts and mutual biometric information feature amounts of each registered user and the matching data of the selected registered user when executing the biometric authentication process. Furthermore, the storage unit 32 temporarily stores the matching data, the individual biometric information feature amounts and the mutual biometric information feature amounts received from the terminal 2 and the identification numbers of the fingers associated with the data and the feature amounts together with the identification information of the user when executing the registration process.

The processing unit 33 includes at least one processor and a peripheral circuitry. Then, the processing unit 33 executes the selection of the registered users and the matching of the input biometric information of the user with the registered biometric information of the selected registered user in the biometric authentication process. The processing unit 33 also executes the registration process.

Figure 5:
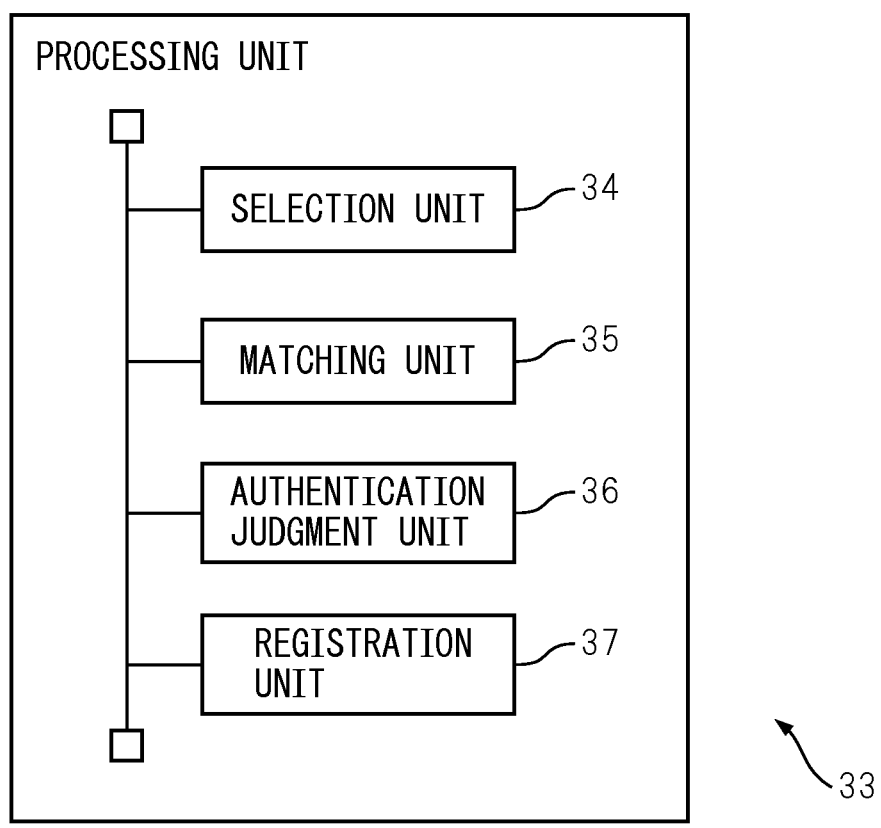
FIG. 5 is a functional block diagram of a processing unit in an authentication server.

FIG. 5 is a functional block diagram of the processing unit 33 in the authentication server 3. The processing unit 33 includes a selection unit 34, a matching unit 35, an authentication judgment unit 36 and a registration unit 37. Each of these units included in the processing unit 33 is a functional module implemented by a computer program executed on the processor included in the processing unit 33. Alternatively, each of these units included in the processing unit 33 may also be implemented as firmware in the authentication server 3.

The selection unit 34, the matching unit 35 and the authentication judgment unit 36 are used when executing the biometric authentication process whereas the registration unit 37 is used when executing the registration process. Thus, the description will be given below in separation into the biometric authentication process and the registration process.

(Biometric Authentication Process)

First, the biometric authentication process of judging whether or not to authenticate a user as any registered user will be described.

The processing unit 33 sends a selecting feature amount request signal to the data server 4 via the communication unit 31 if receiving the individual biometric information feature amounts and mutual biometric information feature amounts of the user from the terminal 2 when executing the biometric authentication process. Then, the processing unit 33 receives the individual biometric information feature amounts and mutual biometric information feature amounts of all the registered users as selecting feature amounts and the identification numbers of the fingers associated with the feature amounts from the data server 4 and temporarily stores them in the storage unit 32. Although the authentication server 3 acquires the selecting feature amounts from the data server 4 when executing the biometric authentication process in the above-described case, the authentication server 3 may also preacquire the selecting feature amounts and store them in the storage unit 32.

The selection unit 34 selects registered users to be matched, based on the individual biometric information feature amounts and the mutual biometric information feature amounts. To do so, based on the individual biometric information feature amounts and mutual biometric information feature amounts of the user received from the terminal 2 and the individual biometric information feature amounts and mutual biometric information feature amounts of each registered user, the selection unit 34 computes a selecting score representing the level of similarity between the biometric information of the user and the biometric information of the registered user. An operation amount needed for computing a selecting score for one registered user is less than the operation amount of the matching process for one registered user. Therefore, the biometric authentication device 1 can reduce the operation amount, compared with the case of executing the matching process for all the registered users, by selecting a registered user to be matched, based on the selecting score, by the selection unit 34.

For example, the selection unit 34 computes a Euclidean distance between the individual biometric information feature amount of the finger of interest of the user and the individual biometric information feature amount of the corresponding finger of the registered user according to the following equation:

$$s_i = \sqrt{\sum_{j=1}^{N_d} (t_{ij} - i_{ij})^2} \quad (4)$$

wherein $t_{i,j}$ and $i_{i,j}$ represent the j-th individual biometric information feature amount of the finger of the identification number i of the user and the j-th individual biometric information feature amount of the finger of the identification number i of the registered user, respectively. In addition, $s_i$ is a Euclidean distance for the finger of the identification number i. The selection unit 34 may also determine the Euclidean distance $s_i$ by normalizing each individual biometric information feature amount to be in a predetermined range (e.g., 0-1) and inputting the normalized individual biometric information feature amount into the equation (4).

The selection unit 34 computes the sum of Euclidean distances determined for respective fingers as an individual biometric information selecting score $s_d$ according to the following equation:

$$s_d = \sum_{i=1}^{M} s_i \quad (5)$$

wherein M is the number of the fingers used for computing the selecting score $s_d$ and is an integer of 1 or more and 10 or less.

The selection unit 34 may also determine a Manhattan distance between the individual biometric information feature amount of the finger of interest of the user and the individual biometric information feature amount of the corresponding finger of the registered user and compute the sum of Manhattan distances determined for respective fingers as the individual biometric information selecting score $s_d$.

Furthermore, the selection unit 34 computes a Euclidean distance between the mutual biometric information feature amount of the user and the mutual biometric information feature amount of the registered user as a mutual biometric information selecting score $s_c$ according to the following equation:

$$s_c = \sqrt{\sum_{k=1}^{N_c} (tc_k - ic_k)^2} \quad (6)$$

wherein $tc_k$ and $ic_k$ represent the k-th mutual biometric information feature amount of the user and the k-th mutual biometric information feature amount of the registered user, respectively. $N_c$ is the total number of mutual biometric information feature amounts. For example, when the biometric image represents the fingerprints of the four fingers as illustrated in FIG. 4, $N_c$ is 6.

The selection unit 34 may also compute as the mutual biometric information selecting score $S_c$ a Manhattan distance between the mutual biometric information feature amount of the user and the mutual biometric information feature amount of the registered user.

The selection unit 34 sets the total ($s_d+s_c$) of the individual biometric information selecting score $s_d$ and the mutual biometric information selecting score $s_c$ as a selecting score. As is clear from the equations (4) to (6), the less the selecting score, the more similar the input biometric information of the user is to the registered biometric information of the registered user. The selection unit 34 may also compute a selecting score by totalizing values obtained by multiplying the individual biometric information selecting score $s_d$ and the mutual biometric information selecting score $s_c$ by weighting factors, respectively. In this case, the weighting factor by which the individual biometric information selecting score $s_d$ is multiplied may also be a value, obtained, for example, by dividing the number of feature amounts used for computing the score $s_d$ by the total of the number of the feature amounts used for computing the score $s_d$ and the number of feature amounts used for computing the score $s_c$. Similarly, the weighting factor by which the mutual biometric information selecting score $s_c$ is multiplied may also be a value obtained by dividing the number of the feature amounts used for computing the score $s_c$ by the total of the number of the feature amounts used for computing the score $s_d$ and the number of the feature amounts used for computing the score $s_c$.

The selection unit 34 computes the selecting score for each registered user. Then, the selection unit 34 selects the second predetermined number of registered users in order of increasing of the selecting score, namely, in order of decreasing the similarity of the registered biometric information of the registered user to the input biometric information. The second predetermined number is a value less than the first predetermined number, which is the total number of the registered users, and is preset depending on the processing capacity of the authentication server 3.

The selection unit 34 may also select only registered users with selecting scores that are less than a predetermined value. Thereby, the number of the selected registered users becomes less than the second predetermined number, so that the operation amount of the entire biometric authentication process may be reduced. For example, the predetermined value is experimentally set so that a false rejection rate at which a registered user in person is not selected is a permitted maximum value or less.

According to a variation example, the selection unit 34 may also compute the mutual biometric information selecting scores $s_c$ for all the registered users to select the third predetermined number of registered users in order of increasing the score $s_c$. In this case, the third predetermined number is set to a value that is higher than the second predetermined number, for example, 2-50 times the second predetermined number. Thereafter, the selection unit 34 may also compute the individual biometric information selecting score $s_d$ for each registered user selected based on the scores $s_c$ to select the second predetermined number of the registered users in order of increasing the score $s_d$.

On the other hand, the selection unit 34 may also compute the individual biometric information selecting scores $s_d$ for all the registered users to select the third predetermined number of the registered users in order of increasing the score $s_d$ and to compute the mutual biometric information selecting score $s_c$ for each registered user selected based on the score $s_d$. Then, the selection unit 34 may also select the second predetermined number of the registered users in order of increasing the score $s_c$.

Since, an as a result, the selection unit 34 can reduce the number of the registered users for which the individual biometric information selecting scores $s_d$ or the mutual biometric information selecting scores $s_c$ are computed, an operation amount for selecting the second predetermined number of the registered users can be reduced. Particularly, the selection unit 34 can further reduce the operation amount for selecting the registered users by first computing the selecting scores corresponding to those of the mutual biometric information feature amounts and the individual biometric information feature amounts, of which the number is smaller, to the registered users.

For example, assume that 10000 registered users are registered. In addition, assume that the number of individual biometric information feature amounts is 100 and the number of mutual biometric information feature amounts is 6. When selecting scores are computed at a time according to the equations (4)-(6) using both of the individual biometric information feature amounts and the mutual biometric information feature amounts, 1060000 (=10000×(100+6)) square operations are needed.

In contrast, when registration users of ⅕ of the total number of the registered users are selected based on the mutual biometric information selecting scores $s_c$, followed by selecting registered users to be matched based on the individual biometric information selecting scores $s_d$, the number of square operations is reduced to 260000 (=10000×6+2000×100).

When the number of mutual biometric information feature amounts is less than the number of individual biometric information feature amounts as described above, the selection unit 34 selects registered users based on the mutual biometric information selecting scores $s_c$. Thereafter, the selection unit 34 selects the registered users to be matched based on the individual biometric information selecting scores $s_d$. Thereby, the selection unit 34 may reduce the number of operations compared with the case in which the registered users to be matched are selected only based on the individual biometric information selecting scores $s_d$.

The selection unit 34 returns the identification information of the selected registered users to the processing unit 33. Then, the processing unit 33 sends the identification information of the selected registered users together with a signal for requesting to send matching data to the data server 4. Then, the processing unit 33 receives the matching data of the selected registered users from the data server 4 and temporarily stores the data in the storage unit 32.

The matching unit 35 matches the input biometric information of the user with the registered biometric information of each selected registered user using the matching data of the user received from the terminal 2 and the matching data of each selected registered user. Then, as a result of the matching process, the matching unit 35 determines the degree of similarity representing the level of similarity of the input biometric information to the registered biometric information for each selected registered user.

The matching unit 35 executes the matching process, for example, using the matching data of any preset finger. Alternatively, the matching unit 35 may also execute the matching process using the matching data of a plurality of fingers. In this case, the matching unit 35 sets the average or maximum value of the degrees of similarity computed for the respective fingers as the degree of similarity between the input biometric information of the user and the registered biometric information of the registered users.

The matching unit 35 may use, for example, minutia-matching or pattern-matching as the matching process.

The matching unit 35 can compute the degree of similarity by the same procedure as the procedure of the minutia-matching or the pattern-matching described in the mutual biometric information feature amount extraction unit 27 even when using any of the minutia-matching and the pattern-matching. For example, the matching unit 35 may compute the degree of similarity between the input biometric information and the registered biometric information by dividing the number of minutiae matching between the registered biometric information and the input biometric information for the finger of interest by the number of minutia extracted for the finger of interest of the user when using the minutia-matching.

Alternatively, the matching unit 35 may compute the degree of similarity by computing the normalization cross-correlation value between finger regions of interest when using the pattern-matching.

The matching unit 35 determines the maximum value of the degrees of similarity, computed for the selected registered users, respectively. Then, the matching unit 35 passes the maximum value of the degrees of similarity and the identification information of the registered user corresponding to the maximum value to the authentication judgment unit 36.

The authentication judgment unit 36 judges that the input biometric information matches with the registered biometric information corresponding to the maximum value of the degrees of similarity when the maximum value of the degrees of similarity is an authentication judgment threshold value or more. Then, the authentication judgment unit 36 authenticates the user as a registered user having the registered biometric information corresponding to the maximum value of the degrees of similarity. When authenticating the user, the authentication judgment unit 36 notifies the processing unit 33 of the authentication result.

In contrast, the authentication judgment unit 36 judges that the input biometric information does not match with the registered biometric information when the maximum value of the degrees of similarity is less than the authentication judgment threshold value. In this case, the authentication judgment unit 36 does not authenticate the user. The authentication judgment unit 36 notifies the processing unit 33 of the authentication result representing failing to authenticate the user. Then, the processing unit 33 may also send authentication result information representing the authentication result to the terminal 2.

The authentication judgment threshold value is preferably set to such a value that the authentication judgment unit 36 succeeds in authentication only when any registered user in person is the user. The authentication judgment threshold value is preferably set to such a value that the authentication judgment unit 36 fails in authentication when another person who is different from the registered users is the user. For example, the authentication judgment threshold value may be set as a value obtaining by adding a value obtained by multiplying a difference between the possible maximum and minimum values of the degrees of similarity by 0.7 to the minimum value of the degrees of similarity.

Figure 6A:
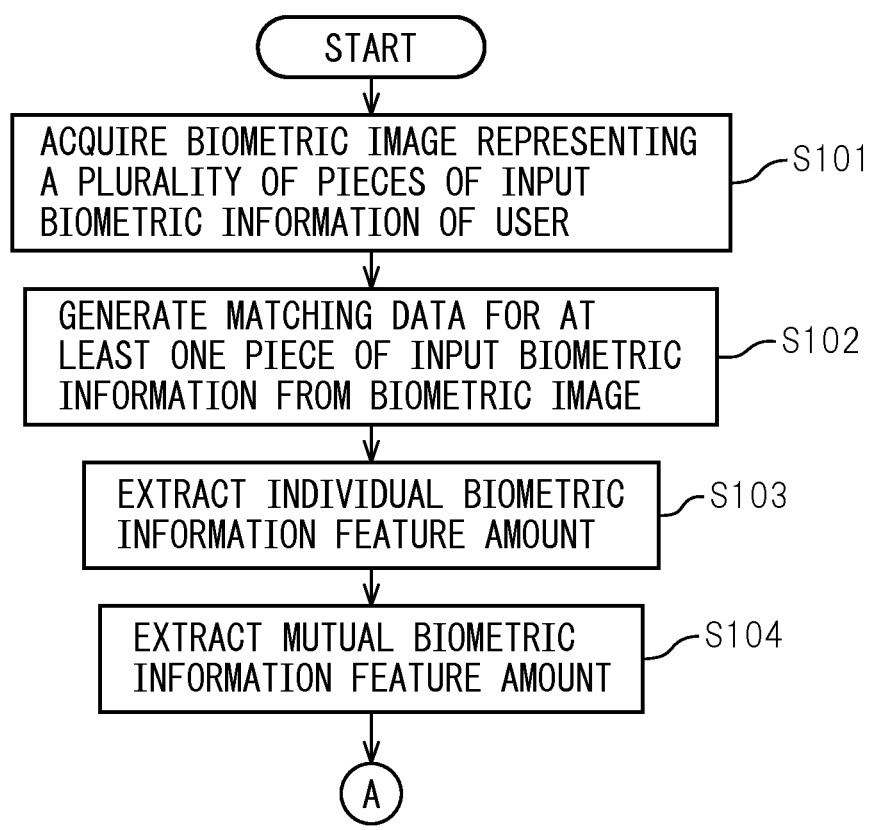
FIG. 6A and FIG. 6B are operation flow charts of a biometric authentication process.
Figure 6B:
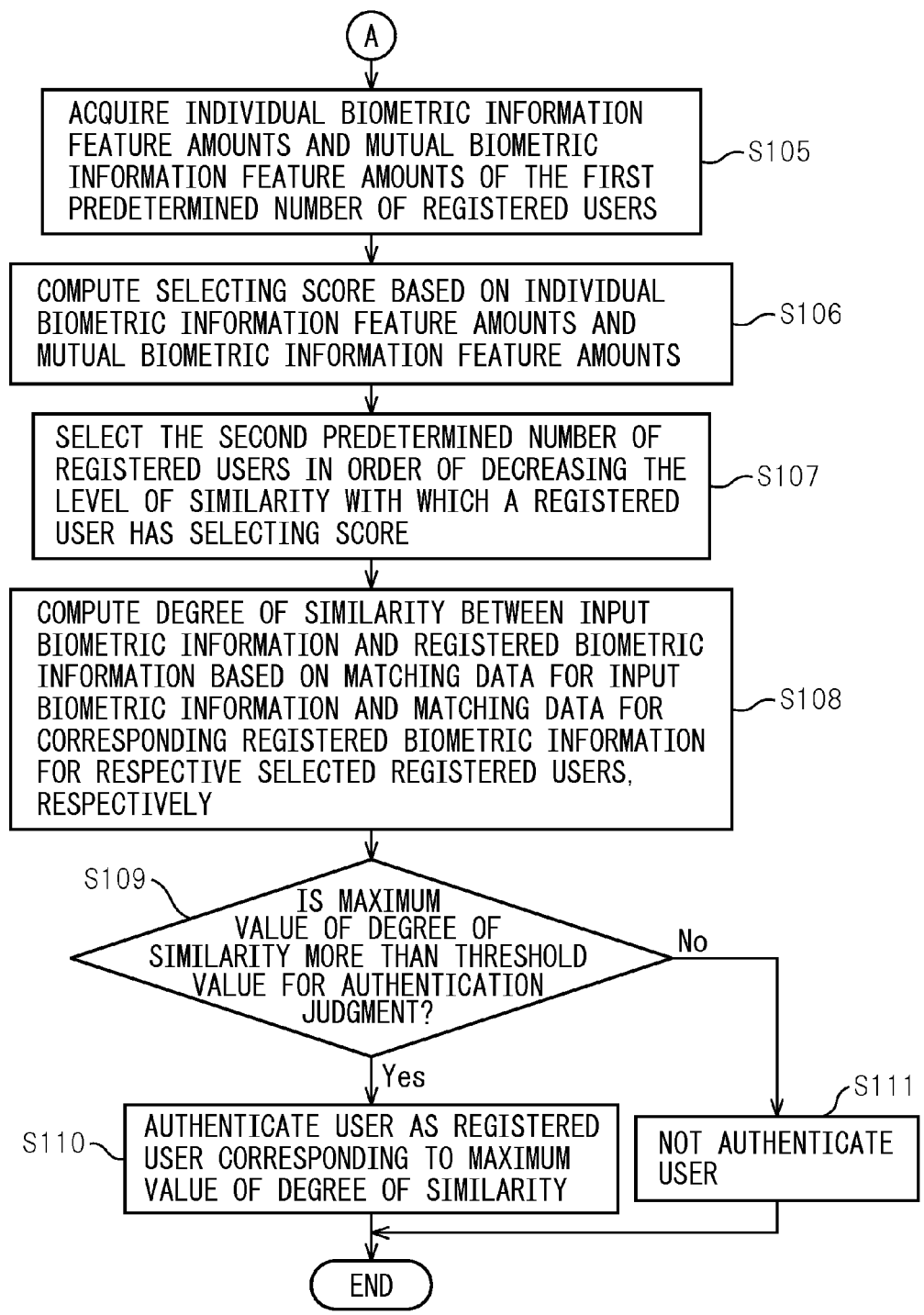

FIG. 6A and FIG. 6B are operation flow charts of the biometric authentication process.

As illustrated in FIG. 6A, the processing unit 24 of terminal 2 acquires a biometric image representing the plurality of pieces of input biometric information of the user from the biometric information acquiring unit 21 (step S101). Then, the matching data generating unit 25 of the processing unit 24 generates matching data for at least one of the plurality of pieces of input biometric information from the biometric image (step S102).

The individual biometric information feature amount extraction unit 26 of the processing unit 24 determines an individual biometric information feature amount for each input biometric information from the biometric image (step S103), and the mutual biometric information feature amount extraction unit 27 of the processing unit 24 determines mutual biometric information feature amounts for every two of the respective pieces of input biometric information (step S104).

The processing unit 24 sends the matching data, the individual biometric information feature amounts and the mutual biometric information feature amounts and the identification numbers of the fingers associated with the data and each feature amount to the authentication server 3 via the communication network 5.

As illustrated in FIG. 6B, when receiving the matching data, individual biometric information feature amounts and mutual biometric information feature amounts of the user and the identification numbers of the finger associated with the data and each feature amount from the terminal 2, the authentication server 3 sends a selecting feature amount request signal to the data server 4. Then, the authentication server 3 acquires the individual biometric information feature amounts and mutual biometric information feature amounts of all the registered users from the data server 4 (step S105). The selection unit 34 of the processing unit 33 of the authentication server 3 computes a selecting score based on the individual biometric information feature amounts and mutual biometric information feature amounts of the user and the individual biometric information feature amounts and mutual biometric information feature amounts of each registered user (step S106). The selection unit 34 selects the second predetermined number of registered users in order of decreasing the level of similarity between the individual biometric information feature amounts and mutual biometric information feature amounts of the user and the individual biometric information feature amounts and mutual biometric information feature amounts of the registered users, represented by the selecting score of a registered user (step S107).

The authentication server 3 sends the identification information of the selected registered users and a matching data request signal to the data server 4. Then, the authentication server 3 receives the matching data of at least one pieces of biometric information of the selected registered users from the data server 4.

For the respective selected registered users, based on the matching data for at least one piece of input biometric information of the user and the matching data for corresponding registered biometric information, the matching unit 35 computes the degrees of similarity between the input biometric information and the registered biometric information, respectively (step S108). Then, the matching unit 35 determines the maximum value of the degrees of similarity and passes the identification information of the registered user corresponding to the maximum value together with the maximum value of the degrees of similarity to the authentication judgment unit 36 of the processing unit 33.

The authentication judgment unit 36 judges whether or not the maximum value of the degrees of similarity is not less than a threshold value for authentication judgment (step S109). When the maximum value of the degrees of similarity is not less than the threshold value for authentication judgment (step S109-Yes), the authentication judgment unit 36 authenticates the user as a registered user associated with the identification information corresponding to the maximum value of the degrees of similarity (step S110). In contrast, the maximum value of the degrees of similarity is less than the threshold value for authentication judgment (step S109-No), the authentication judgment unit 36 does not authenticate the user (step S111).

After step S110 or S111, the biometric authentication device 1 finishes the biometric authentication process.

The biometric authentication device 1 may interchange the order of the processes of steps S102 to S104.

(Registration Process)

The registration process of registering the biometric information of the registered users as the registered biometric information will be described below.

FIG. 7 is an operation flowchart of the registration process.

The processing unit 24 of the terminal 2 acquires the user name of the user via the input unit which is not illustrated (step S201). The processing unit 24 acquires a biometric image representing the plurality of pieces of biometric information of the user from the biometric information acquiring unit 21 (step S202). Then, the matching data generating unit 25 of processing unit 24 generates matching data for at least one of the plurality of pieces of biometric information from the biometric image (step S203).

The individual biometric information feature amount extraction unit 26 of the processing unit 24 determines an individual biometric information feature amount for each biometric information from the biometric image (step S204), and the mutual biometric information feature amount extraction unit 27 of the processing unit 24 determines mutual biometric information feature amounts for every two of the respective pieces of biometric information (step S205).

The processing unit 24 sends the user name, matching data, individual biometric information feature amounts and mutual biometric information feature amounts of the user and the identification numbers of the fingers associated with the data and the feature amounts to the authentication server 3 via the communication network 5.

When the authentication server 3 receives, together with the user name of the user, the matching data, the individual biometric information feature amounts, the mutual biometric information feature amounts and the identification numbers of the fingers associated with the data and the feature amounts, the registration unit 37 of the processing unit 33 sets a user identification number which is set uniquely for the user. Then, the registration unit 37 generates a registration request signal (step S206). The registration request signal includes the user name, identification information such as the user identification number, matching data, individual biometric information feature amounts and mutual biometric information feature amounts of the user and the identification numbers of the fingers associated with the data and the feature amounts. Then, the registration unit 37 sends the registration request signal to the data server 4 (step S207).

When receiving the registration request signal, the control unit 43 of the data server 4 stores pieces of information such as the identification information, matching data, individual biometric information feature amounts and mutual biometric information feature amounts of the user included in the registration request signal in the storage unit 42 (step S208). Then, the biometric authentication device 1 finishes the registration process.

The biometric authentication device 1 may also interchange the order of the processes of steps S201 and S202. The biometric authentication device 1 may also interchange the order of the processes of steps S203-S205.

As described above, the biometric authentication device according to this embodiment selects a registered user to be matched, based on the mutual biometric information feature amounts representing the degrees of similarity between the plurality of pieces of biometric information of the user. Since the degree of varying the mutual biometric information feature amounts by a user is high although the number of the mutual biometric information feature amounts is small, the biometric authentication device can adequately select a registered user to be subjected to the matching process by using the mutual biometric information feature amounts. As is clear from the equation (1) to the equation (6), the operation amount for computing the selecting score is less than the operation amount of the matching process by the matching unit. Therefore, the biometric authentication device can reduce the operation amount of the biometric authentication process in the 1:N authentic mode.

The biometric authentication device according to the second embodiment will be described below. The biometric authentication device according to the second embodiment includes a plurality of slave authentication servers and shortens processing time needed for a biometric authentication process by executing the biometric authentication process with the respective slave authentication servers in parallel. Among the respective components of the biometric authentication device according to the second embodiment, differences from the components of the biometric authentication device according to the first embodiment will be described below.

Figure 8:
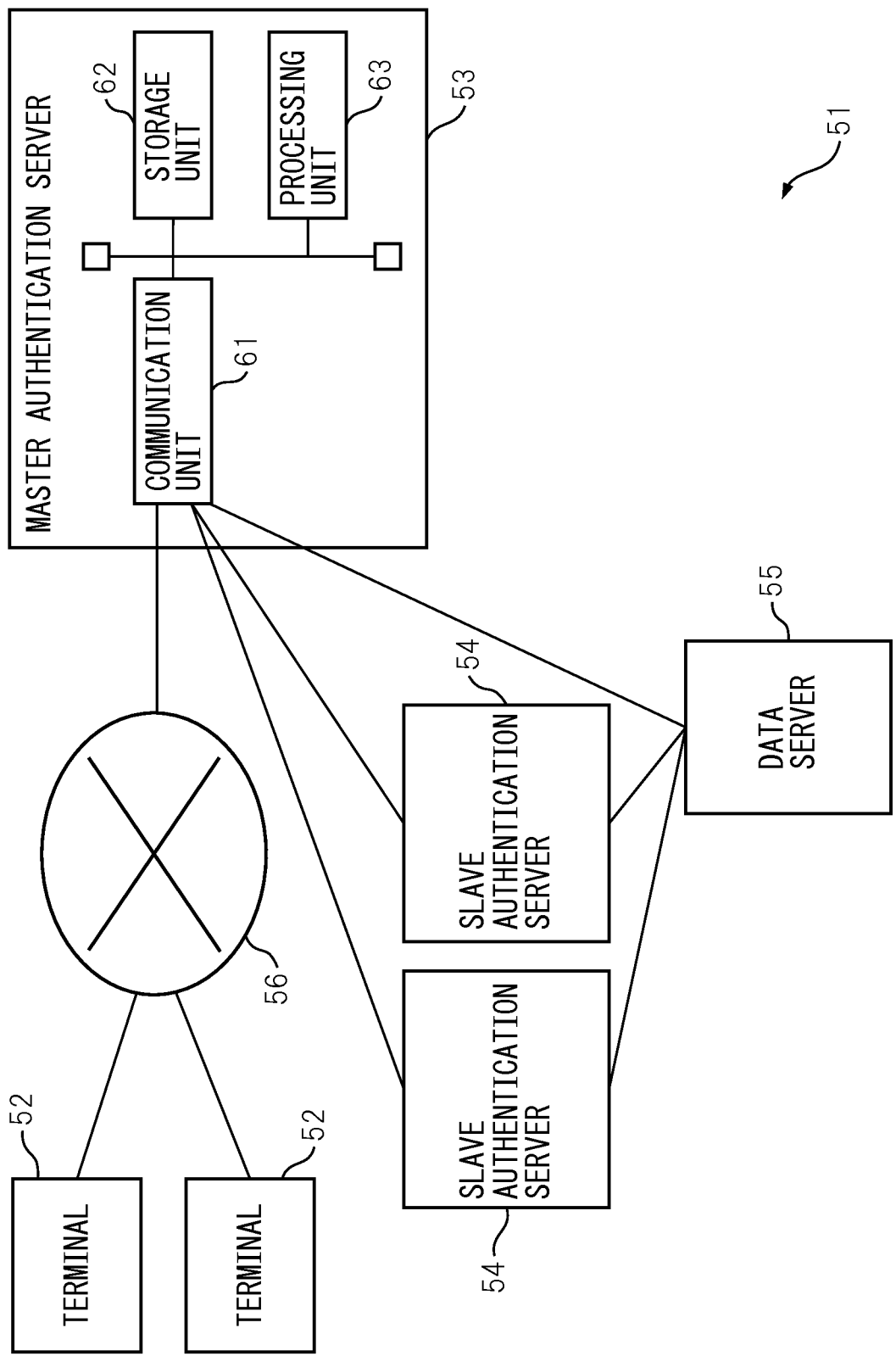
FIG. 8 is a diagram illustrating the configuration of a biometric authentication device according to a second embodiment.

FIG. 8 is a diagram illustrating the configuration of the biometric authentication device according to the second embodiment. The biometric authentication device 51 includes at least one terminal 52, one master authentication server 53, at least one slave authentication server 54 and a data server 55. The terminal 52 and the master authentication server 53 are connected to each other via a communication network 56 such as for example a public communication channel or a local area network. The master authentication server 53, each slave authentication server 54 and the data server 55 are mutually connected, for example, via a specific communication channel or another communication network independent of the communication network 56. The master authentication server 53, each slave authentication server 54 and the data server 55 may also be connected to each other via the communication network 56.

The configurations of the terminal 52, the slave authentication server 54 and the data server 55 are same as those of the terminal 2, the authentication server 3 and the data server 4 in accordance with the first embodiment, respectively.

The terminal 52 determines matching data, individual biometric information feature amounts and mutual biometric information feature amounts from a biometric image representing the plurality of pieces of biometric information of the user. Then, the terminal 52 sends the matching data, the individual biometric information feature amounts and the mutual biometric information feature amounts and the identification numbers of the fingers associated with the data and the feature amounts to the master authentication server 53 when executing a biometric authentication process. The terminal 52 sends the matching data, the individual biometric information feature amounts and the mutual biometric information feature amounts and the identification numbers of the fingers associated with the data and the feature amounts together with the identification information of the user to the master authentication server 53 when executing a registration process.

The master authentication server 53 includes a communication unit 61, a storage unit 62 and a processing unit 63. The communication unit 61 includes: an interface circuitry for connecting the master authentication server 53 to the communication network 56; and an interface circuitry for connecting the master authentication server 53 to the slave authentication server 54 and the data server 55.

The storage unit 62 includes for example, at least any one of a semiconductor memory, a magnetic disk unit and an optical disk drive. The storage unit 62 stores various programs used for controlling the master authentication server 53 and data. The storage unit 62 also temporarily stores the matching data, the individual biometric information feature amounts and the mutual biometric information feature amounts received from the terminal 2 and the identification numbers of the fingers associated with the data and the feature amounts. Furthermore, the storage unit 62 stores the range of the identification information of the registered users subjected to the biometric authentication process by each slave authentication server 54. Furthermore, the storage unit 62 temporarily stores the maximum value of the degrees of similarity obtained as a result of the biometric authentication process by each slave authentication server 54 and the identification information of a registered user corresponding to the maximum value.

The processing unit 63 includes at least one processor and a peripheral circuitry.

FIG. 9 is a functional block diagram of the processing unit 63 of the master authentication server 53. The processing unit 63 includes a distribution unit 64, an integration authentication judgment unit 65 and a registration unit 66. Since the process of the registration unit 66 among them is same as that of the registration unit 37 according to the first embodiment, the detailed description of the registration unit 66 will be omitted.

The distribution unit 64 sends the matching data, individual biometric information feature amounts and mutual biometric information feature amounts of the user received from the terminal 52 and the identification numbers of the fingers associated with the data and the feature amounts to each slave authentication server 54 when executing the biometric authentication process. Furthermore, the distribution unit 64 notifies each slave authentication server 54 of the range of the identification information of the registered users subjected to the biometric authentication process in the slave authentication server 54. For example, the distribution unit 64 computes the number of the registered users subjected to the biometric authentication process by each slave authentication server 54 by dividing the total number of the registered users by the number of slave authentication servers 54 so that the loads of the respective slave authentication servers 54 are equal. Then, the distribution unit 64 sets the range of the identification information of the registered users, of which each slave authentication server 54 is notified, in each slave authentication server 54 so that the number of the registered users is included and the registered users subjected to the biometric authentication process by each slave authentication server 54 are unique.

The distribution unit 64 may also receive a signal presenting the load of the slave authentication server from each slave authentication server 54 periodically or every time of execution of the biometric authentication process. Then, the distribution unit 64 may also set the range of the identification information of the registered users, of which each slave authentication server 54 is notified, so that the number of the registered users subjected to the biometric authentication process is increased with decreasing the load of the slave authentication server.

For the registered users associated with each slave authentication server 54, the processes except the processes by the authentication judgment units are executed among the same biometric authentication processes as in the above-described embodiments. Specifically, the respective slave authentication servers 54 receive the individual biometric information feature amounts and mutual biometric information feature amounts of the registered users included in the range of the identification information of the registered users notified from the master authentication server 53 among all the registered users registered in the data server 55 from the data server 55. Then, each slave authentication server 54 computes a selecting score and determines a selected registered user based on the selecting score. Then, the slave authentication servers 54 receive the matching data of the registered biometric information of each selected registered user from the data server 55. The slave authentication servers 54 determine the degrees of similarity between registered biometric information and input biometric information for each of the selected registered users using the matching data of the input biometric information received from the master authentication server 53 and the matching data of the selected registered users. Then, the slave authentication servers 54 send the maximum value of the degrees of similarity and the identification information of the registration user corresponding to the maximum value to the master authentication server 53.

The integration authentication judgment unit 65 of the processing unit 63 of the master authentication server 53 determines the overall maximum value that is the maximum value of the maximum values of the degrees of similarity received from the respective slave authentication servers 54. When the overall maximum value is the authentication judgment threshold value or more, the integration authentication judgment unit 65 authenticates the user as the registered user corresponding to the overall maximum value. In contrast, when the overall maximum value is less than the authentication judgment threshold value, the integration authentication judgment unit 65 does not authenticate the user.

Then, the integrate authentication judgment unit 65 notifies the terminal 52 of the authentication result.

According to this embodiment, since the plurality of slave authentication servers execute the biometric authentication process in parallel, the biometric authentication device can further shorten processing time needed for the biometric authentication process.

In accordance with the second embodiment, the master authentication server, together with the slave authentication servers, may also execute the biometric authentication process for the registered users having identification information in the range of the predetermined identification information. In this case, the processing unit of the master authentication server further realizes the functions of the selection unit and the matching unit among the functions of the processing unit of the authentication server according to the first embodiment.

According to the variation example, in accordance with each embodiment as described above, the selection unit may also select registered users in a simple selection process for selecting the registered users at an operation amount less than the operation amount needed for computing the selecting score prior to computing selecting scores. Then, the selection unit may also compute the selecting score for each of the selected registered users and select the second predetermined number of registered users based on the selecting score.

For example, as the simple selection process, based on the individual biometric information feature amounts of any finger of the user, the selection unit may also set the selection range of the individual biometric information feature amounts and select registered users having individual biometric information feature amounts in the selection range. For example, the selection unit may also select registered users of which the ridges of the nimble fingers have widths included in the range of 4 pixels to 6 pixels when the ridge of the nimble finger of the user has a width of 5 pixels. Alternatively, as the simple selection process, based on mutual biometric information feature amounts between optional two fingers of the user, the selection unit may also set the selection range of the mutual biometric information feature amounts for the two fingers and select registered users having the mutual biometric information feature amounts in the selection range. For example, when the degree of similarity between the fingerprints of the nimble and middle fingers of the user, which degree is a mutual biometric information feature amount, is 0.5, the selection unit may also select registered users of which the degrees of similarity between the fingerprints of the nimble and middle fingers are included in the range of 0.3-0.7.

Alternatively, as the simple selection process, the selection unit may also select users having the same type's of fingerprints as the type of the fingerprint of any finger of the user. The type of a fingerprint is determined depending on the arrangement of a singular point such as for example a whorl center or a delta on the fingerprint. In this case, the individual biometric information extraction unit detects the singular point, for example, according to the method for detecting a singular point, as described in the matching data generating unit, and determines the type of the fingerprint depending on the arrangement of the singular point. Then, the terminal sends to the authentication server the type of the fingerprint as one of the individual biometric information feature amounts.

FIG. 10A to FIG. 10C are schematic views of fingerprints representing representative fingerprint types, respectively. In each figure, a whorl center 1001 of which the ridge is convex upward is represented as a circular arc which is convex upward. The direction of the ridge forming the whorl center is represented by an arrow 1002. A delta 1003 is represented by a triangle.

A fingerprint 1100 as illustrated in FIG. 10A is a so-called right loop type fingerprint. The fingerprint 1100 includes the whorl center 1001 and the one delta 1003. In the right loop type fingerprint 1100, the delta 1003 is present in the right of the whorl center 1001, and the direction 1002 of the ridge forming the whorl center 1001 is directed in the lower left direction of the whorl center 1001 from the whorl center 1001.

In contrast, a fingerprint 1200 as illustrated in FIG. 10B is a so-called left loop type fingerprint. The fingerprint 1200 has a structure that is mirror-symmetrical to the right loop type fingerprint 1100.

A fingerprint 1300 as illustrated in FIG. 10C is a so-called arch type fingerprint. The fingerprint 1300 has the whorl center 1001 but does not have any other singular points.

In this case, for example, the selection unit selects registered users whose types of the fingerprints of the nimble fingers are right loop types when the type of the fingerprint of the nimble finger of the user is the right loop type of the fingerprint as the simple selection process.

According to another variation example, the selection unit of the authentication server according to each embodiment as described above may also compute a selecting score only based on mutual biometric information feature amounts. In this case, the selecting score is computed, for example, according to the equation (6). Thereby, the authentication server can further reduce an operation amount for selecting registered users to be subjected to the matching process. In this case, the processing unit of the terminal need not have the functions of the individual biometric information feature amount extraction unit.

In yet another variation example, the biometric information acquiring unit may be one that generates a biometric image representing one piece of biometric information, such as for example a sweep-type fingerprint sensor. In this case, the biometric information acquiring unit generates a plurality of biometric images. Each biometric image represents an image of a site having the different biometric information of the user. In addition, the individual biometric information feature amount extraction unit extracts, from each biometric image, the individual biometric information feature amounts of the biometric information represented by the biometric image. The mutual biometric information feature amount extraction unit preferably determines the mutual biometric information feature amounts by determining the degree of similarity between pieces of biometric information represented by each biometric image in the same manner as in the first embodiment.

In yet another variation example, the storage unit of the authentication server may also store data for the biometric authentication process related to all the registered users. In this case, the data server may also be omitted. The terminal, the authentication server and the data server may also be integrated as one biometric authentication device. In this case, the processing unit of the integrated biometric authentication device realizes the functions of the processing unit of the terminal and the functions of the processing unit of the authentication server in each embodiment as described above. The storage unit of the integrated biometric authentication device stores data for the biometric authentication process related to all the registered users.

In accordance with yet another variation example, a registration device for registering the matching data and selecting feature amounts of the user in the data server may also be connected to the data server so that the registration device can communicate with the data server, separately from the terminal and the authentication server. In this case, the registration device includes each component of the terminal, and the processing unit of the registration device realizes the functions of the registration unit of the authentication server.

Furthermore, a computer program which makes a computer realize each function of the processing unit of the terminal and each function of the processing unit of the authentication server may also be provided in the form of being recorded in a recording medium readable by a computer, such as a magnetic recording medium or an optical recording medium.

When another piece of biometric information is used as biometric information to be subjected to biometric authentication, the biometric authentication device preferably extracts individual biometric information feature amounts and mutual biometric information feature amounts depending on the biometric information. For example, when a finger vein pattern is used as the biometric information, the biometric authentication device may use the number of veins per unit area, which can be detected by binarizing a biometric region into pixels representing the veins and the other pixels and thinning the pixels representing the veins, as an individual biometric information feature amount. The biometric authentication device may also use a difference between the numbers of veins per unit area as a mutual biometric information feature amount.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A biometric authentication device comprising:
a biometric information acquiring unit which generates at least one biometric image representing a plurality of pieces of biometric information of a user;
a storage unit which, for each of a first predetermined number of registered users, stores matching data representing a feature for at least one of the plurality of pieces of biometric information and a mutual biometric information feature amount representing a degree of similarity between two pieces of biometric information of a plurality of pieces of biometric information;
a processor configured to generate the matching data from the at least one biometric image;
extract the mutual biometric information feature amount from the at least one biometric image;
for each of the first predetermined number of the registered users, compute a first selecting score representing a level of similarity between the plurality of pieces of biometric information of the user and the plurality of pieces of biometric information of the registered users, based on the mutual biometric information feature amount of the user and the mutual biometric information feature amounts of the registered users,
select a second predetermined number of registered users less than the first predetermined number in order of decreasing the level of similarity based on the first selecting score for each of the first predetermined number of registered users; and
match the matching data of the selected registered users with the matching data of the user.

2. The biometric authentication device according to claim 1, wherein the storage unit further stores, for each of the first predetermined number of registered users, an individual biometric information feature amount representing a feature of at least one of the plurality of pieces of biometric information, and wherein
the processor is further configured to extract the individual biometric information feature amount of at least one of the plurality of pieces of biometric information of the user from the at least one biometric image; and
compute a second selecting score representing a level of similarity between the plurality of pieces of biometric information of the user and the plurality of pieces of biometric information of the registered users based on the individual biometric information feature amount for the at least one piece of biometric information of the user and biometric information corresponding to the at least one piece of biometric information of the registered users and select the second predetermined number of registered users based on the first selecting score and the second selecting score.

3. The biometric authentication device according to claim 1, wherein
the processor is further configured to generate the matching data for at least two pieces of biometric information of the plurality of pieces of biometric information from the at least one biometric image; and
extract the mutual biometric information feature amount using the matching data.

4. The biometric authentication device according to claim 2, wherein the processor is further configured to determine a total value of the first selecting score and the second selecting score for each of the first predetermined number of the registered users, and select the second predetermined number of registered users in order of decreasing the level of similarity between the plurality of pieces of biometric information of the user and the plurality of pieces of biometric information of the registered users, based on the total value for each of the first predetermined number of registered users.

5. The biometric authentication device according to claim 2, wherein the processor is further configured to select a third predetermined number of registered users less than the first predetermined number and more than the second predetermined number in order of decreasing the level of similarity between the plurality of pieces of biometric information of the user and the plurality of pieces of biometric information of the registered users, based on the first selecting score for each of the first predetermined number of registered users; and
select the second predetermined number of registered users among the third predetermined number of selected registered users in order of decreasing the level of similarity between the plurality of pieces of biometric information of the user and the plurality of pieces of biometric information of the registered users, based on the second selecting score for each of the third predetermined number of selected registered users.

6. The biometric authentication device according to claim 2, wherein the processor is further configured to select a third predetermined number of registered users less than the first predetermined number and more than the second predetermined number in order of decreasing the level of similarity between the plurality of pieces of biometric information of the user and the plurality of pieces of biometric information of the registered users, based on the second selecting score for each of the first predetermined number of registered users; and
select the second predetermined number of registered users among the third predetermined number of selected registered users in order of decreasing the level of similarity between the plurality of pieces of biometric information of the user and the plurality of pieces of biometric information of the registered users, based on the first selecting score for each of the third predetermined number of selected registered users.

7. The biometric authentication device according to claim 2, wherein
the processor is further configured to extract the individual biometric feature amount for at least two pieces of biometric information of the plurality of pieces of biometric information from the at least one biometric image; and
extract the mutual biometric information feature amount using the individual biometric feature amount.

8. The biometric authentication device according to claim 7, wherein
the biometric information is a fingerprint; and
the processor is further configured to extract the individual biometric feature amount in a state of matching longitudinal directions of fingerprints on the at least one biometric image for at least two pieces of biometric information of the plurality of pieces of biometric information; and
extract the mutual biometric information feature amount using the individual biometric feature amount extracted in a state of matching the longitudinal directions of fingerprints on the at least one biometric image.

9. A biometric authentication method comprising:
generating at least one biometric image representing a plurality of pieces of biometric information of a user;
generating matching data representing a feature for at least one of the plurality of pieces of biometric information from the at least one biometric image;
extracting a mutual biometric information feature amount representing a degree of similarity between two pieces of biometric information of the plurality of pieces of biometric information in the at least one biometric image;
computing, for each of a first predetermined number of registered users, a first selecting score representing a degree of similarity between the plurality of pieces of biometric information of the user and the plurality of pieces of biometric information of the registered user based on the mutual biometric information feature amount of the user and the mutual biometric information feature amount of the registered user, and selecting a second predetermined number of registered users less than the first predetermined number in order of decreasing the level of similarity based on the first selecting score for each of the first predetermined number of registered users; and
matching the matching data of the selected registered users with the matching data of the user.

10. A non-transitory computer-readable recording medium in which a computer program for biometric authentication is recorded, the computer program making a computer execute:
generating, from at least one biometric image representing a plurality of pieces of biometric information of a user, matching data representing a feature for at least one of the plurality of pieces of biometric information;
extracting a mutual biometric information feature amount representing a degree of similarity between two pieces of biometric information of the plurality of pieces of biometric information in the at least one biometric image;
computing, for each of a first predetermined number of registered users, a first selecting score representing a degree of similarity between the plurality of pieces of biometric information of the user and the plurality of pieces of biometric information of the registered user based on the mutual biometric information feature amount of the user and the mutual biometric information feature amount of the registered user, and selecting a second predetermined number of registered users less than the first predetermined number in order of decreasing the level of similarity based on the first selecting score for each of the first predetermined number of registered users; and
matching the matching data of the selected registered users with the matching data of the user.

\* \* \* \* \*